United States Patent [19]

Cambridge et al.

[11] 3,784,755

[45] Jan. 8, 1974

[54] LONG-LINE TELEPHONE CIRCUIT

[75] Inventors: Ronan M. Cambridge; Milan Chytil, both of Ottawa, Ontario, Canada

[73] Assignee: Bell Canada-Northern Electric Research Limited, Ottawa, Ontario, Canada

[22] Filed: Sept. 7, 1971

[21] Appl. No.: 178,198

[52] U.S. Cl. .......... 179/16 F, 179/81 A, 179/170 D

[51] Int. Cl. .......................... H04b 1/52, H04m 1/60

[58] Field of Search ............... 179/16 F, 81 B, 81 R, 179/170 R, 170 D, 170 T, 81 A, 80, 16 EC; 333/11

[56] References Cited

UNITED STATES PATENTS

| | | | |
|---|---|---|---|
| 3,482,050 | 12/1969 | Jonsson et al. | 179/16 F |
| 3,660,609 | 5/1972 | Tremblay et al. | 179/16 F |
| 3,372,239 | 3/1968 | Clement | 179/81 B |
| 3,146,313 | 8/1964 | Ulin | 179/81 B |
| 3,075,045 | 1/1963 | Clemency | 179/81 B |
| 3,027,428 | 3/1962 | Eklov | 179/170 R |
| 2,369,144 | 2/1945 | Herrick | 179/81 B |
| 2,336,888 | 12/1943 | Reier | 179/81 B |
| 3,251,946 | 5/1966 | Pfleiderer et al. | 179/170 R |
| 2,145,095 | 1/1939 | Pfleiderer | 179/16 EC |

*Primary Examiner*—Kathleen H. Claffy
*Assistant Examiner*—Randall P. Myers
*Attorney*—John E. Mowle

[57] ABSTRACT

A long-line telephone circuit which utilizes a combination of two-wire and four-wire transmission to advantage in order to achieve subscriber loop lengths of up to 36,000 feet from a central office with less overall conductive material (i.e. finer gauge wire) than is currently used and without the necessity of employing loading coils in the lines.

4 Claims, 1 Drawing Figure

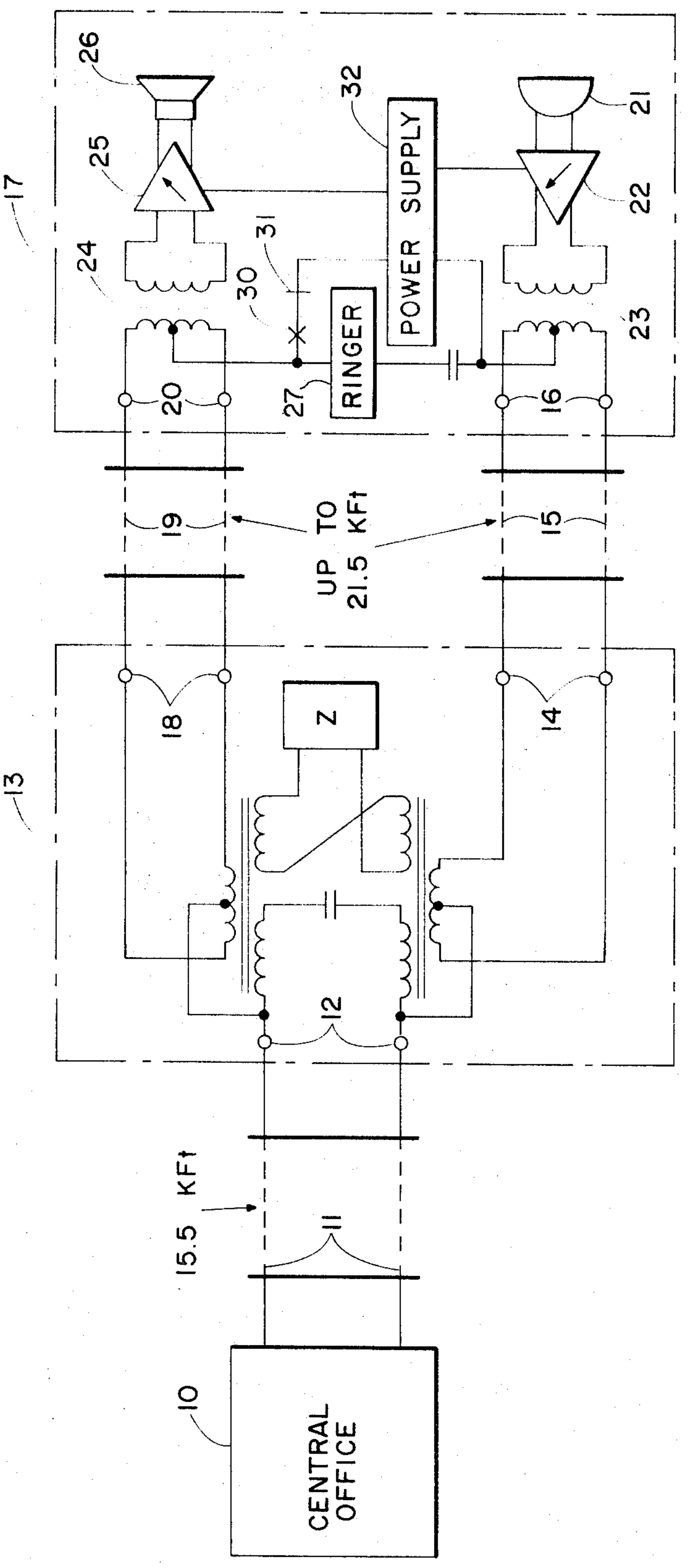
POWER SUPPLY
RINGER
UP TO 21.5 KFt
Z
15.5 KFt
CENTRAL OFFICE

LONG-LINE TELEPHONE CIRCUIT

FIELD OF THE INVENTION

This invention relates to a long-line telephone circuit and, more particularly, to one which provides improved performance at reduced cost.

In conventional telephone systems, telephone sets are connected to a central office by a telephone line comprising a single pair of wires. The signal loss along the telephone line, commonly known as the subscriber loop, depends not only upon the distance from the central office but also upon the resistance and capacitance of the wire which, of course, depends upon its gauge. Current North American subscriber loops are designed to have a resistance limit of 1300 ohms. This allows a range of about 15,500 feet using No. 26 AWG copper wire. Longer ranges require heavier gauges. A transmission loss is introduced in short loops by means of a shunting losser circuit so that the variations in transmission signal level between loops of varying length is reduced. It is to be noted that full loss compensation is not achieved. Thus shunting losser circuit reduces the input impedance of the telephone set on short loops to an extent that echoes result. If loops having greater loss than those associated with the 1300 ohm limit were employed, or if full loss compensation for a 1300 ohm loop was used, echoes on short loops would become excessive. With larger urban and rural developments, significant numbers of telephone sets are located beyond 15,500 feet and up to 36,000 feet from the central office with a few beyond this. It is in this area between 15,500 and 36,000 feet to which the present invention is directed.

DESCRIPTION OF THE PRIOR ART

Because of the capacitance between a pair of telephone wires and the resistance along it, the telephone line acts as a low pass filter thus significantly attenuating higher voice frequencies. In subscriber loops over 18,000 feet, it is common practice to add loading coils along the line to correct for this frequency roll-off and to use heavier gauge wire to reduce losses. Typically, No. 26 AWG copper wire is used for loops up to about 15,500 feet, No. 24 AWG copper wire for those up to about 25,000 feet and No. 22 AWG copper wire for those up to about 39,000 feet. It is significant to note that the cross-sectional area of the wire (and hence the amount of conductive material, generally copper) doubles every three gauges. Thus, No. 22 gauge wire contains about 2 ½ times the amount of copper as No. 26 gauge wire.

It is evident that all telephone circuits must provide satisfactory transmission qualtiy for various lengths of subscriber loops and that the contrast between short and long loops be minimized. To achieve this, it is important that transmission losses of the loops be equalized and that satisfactory echo return loss be maintained. In addition, it is necessary that a satisfactory sidetone level be maintained. This is the ratio of power delivered from the transmitter to the receiver by a local sidetone path in the subscriber set. Too high a sidetone level will be annoying to the local talker and, in extreme cases, produce excessive noise in the receiver if room noise is high. Too low a sidetone level will create the impression that the telephone is dead. In general, a ratio of about 11 db between the two is considered to be optimum.

In a standard telephone handset, the transmitter and receiver are connected to a telephone line through a hybrid which at least partially isolates them from each other. For good isolation, the various ports of the hybrid must be terminated in a matching impedance. One common means for maintaining a relatively constant signal level for differing lengths of subscriber loops is to place a variable impedance, such as a varistor, in shunt with the telephone line. This provides a variable shunt loss which acts bilaterally on both transmit and receive signals. The amount of loss varies with the loop current which, in turn, varies with the loop resistance. This shunt loss substantially reduces the input impedance of the set on short loops and tends to cause mismatch at the input to the hybrid, thus resulting in poor echo return loss.

A second alternative of compensating for the loss in long loops is to employ separate variable gain amplifiers in the transmit and receive paths. With this arrangement, the gain necessary to compensate for the loop transmission loss appears twice in the sidetone path. As a result, the sidetone level increases with the length of the subscriber loop. Unlike the previous approach, the input impedance of the telephone set can be maintained substantially constant. However, the impedance looking towards the central office from the set still varies depending on the length of the subscriber loop and the terminating impedance in the central office. Consequently, it is very difficut to optimally balance the hybrid to maximize the return loss. A compromise balance must therefore be used.

A third alternative is to run a four-wire circuit to the central office and locate the hybrid there. Since the transmission loss in both paths is now located between the hybrid and the telephone set, it can be readily compensated for by the addition of separate transmit and receive amplifiers located at the set without affecting the sidetone level. However, a difficulty which is encountered with such a system is that the impedance of the central office as seen from the hybrid still varies considerably depending upon the terminating impedance of the central office which varies from call to call. As a result, it is again difficult to properly balance the hybrid to maintain a satisfactory return loss. In addition, the cost of running four wires the total distance from the telephone set to the central office increases the overall cost of each subscriber loop. Thus, all of the above alternatives suffer from either significant variations in the sidetone level, poor return loss or high cost due to the utilization of heavy gauge wire and/or loading coils.

SUMMARY OF THE INVENTION

It has been discovered that these problems can be overcome in a long-line telephone circuit by locating a three port network, such as a hybrid, a fixed distance from the central office so that there is sufficient loss between the two to present a substantially constant impedance over the two-wire telephone line as seen from the hybrid looking towards the central office. The balance of the distance from the hybrid to the telephone set is carried over a four-wire telephone line with amplifiers located at the set to compensate for the loss of the two and four-wire lines. With sufficient loss between the hybrid and the central office, the impedance as seen from the former will be substantially constant regardless of the terminating impedance presented by the office itself. As a result, the hybrid can be optimized for maximum return loss. Additionally, because the gain of the amplifiers is varied to compensate for the loss of the variable length four-wire lines and because the hybrid is remotely located from the telephone set, the sidetone level can be maintained at a substantially constant level regardless of the loop length of the four-wire path.

Utilization of loading coils up to distances of 36,000 feet from the central office is not necessary because amplifiers having a rising gain characteristic with frequency can be used to compensate for the overall loss of the telephone lines connecting the telephone set to the central office. In previous systems where the hybrid was located in the telephone set this was not possible because the amount of gain required by the amplifiers to overcome the total line loss would cause an intolerable sidetone level due to the lack of compensating loss in the sidetone path.

Additionally, smaller gauge wire such as No. 26 AWG can be used for a subscriber loop up to 36,000 feet. The reason for this is that high gain amplifiers can be used in both the transmit and receive paths since, as previously explained, they do not affect the sidetone level. While four wires are required between the hybrid and the telephone set, it is to be noted that because the smaller No. 26 gauge wire rather than the larger No. 22 gauge wire can be used throughout, the overall amount of conductive material is less. In addition, such a system permits the use of uni-gauge wire for the vast majority of telephone installations rather than the multi-gauge wires currently in use, thus simplifying the installation program.

Thus, by placing the hybrid between the central office and the telephone set on a long-line telephone circuit, a significant reduction in cost can be obtained by the use of finer gauge wire and the elimination of the loading coils. In addition, the sidetone level is maintained substantially constant and the hybrid can be readily balanced for maximum return loss.

This system allows the design of a telephone distribution system around a central office in which about 98 percent of all subscribers are served by non-loaded 26 gauge subscriber loops. Each station may automatically equalize the losses between it and the central office to achieve constantly satisfactory transmission. No loading, heavy gauge loops or central office repeaters are required. Special provisions can be made for the remaining 2 percent which are beyond the range of the No. 26 AWG gauge system or about 36,000 feet from the central office.

It is to be noted that known two-wire systems in which gain is introduced at the station, to compensate for loop losses, cannot work at this range without producing excessive sidetone. Means for suppressing sidetone by utilizing variable loss networks introduced into the sidetone path when the transmitter is in use are expensive and subjectively unsatisfactory.

BRIEF DESCRIPTION OF THE DRAWING

An example embodiment of the invention will now be described with reference to the accompanying drawing which illustrates a long-line telephone circuit.

DESCRIPTION OF THE PREFERRED EMBODIMENT

Referring to the single figure, the long-line telephone circuit is connected to a central office 10. The circuit itself comprises a first telephone line 11 of a fixed predetermined length connected to a two-wire termination 12 of a hybrid 13, which acts as a three port network. The input 14 of a four-wire termination of the hybrid 13 is connected through a second telephone line 15 to the output 16 of a telephone set 17. The output 18 of the four-wire termination is connected through a third telephone line 19 to the input 20 of the telephone set 17.

Within the telephone set 17, a transmitter 21 is connected through a transmit amplifier 22 and a transformer 23 to the second telephone line 15. The third telephone line 19 is connected through a transformer 24 and an amplifier 25 to a receiver 26.

Ringing power from the central office 10 is phantomed through the hybrid 13 in a conventional manner and is then taken from the center tap of the primary of the two transformers 23 and 24 to provide current for a ringer 27. In addition, d-c power from the transformers 23 and 24 for the amplifiers 22 and 25 is connected through a hook switch 30 and a dial 31 to a power supply 32, the output of which is then coupled to the amplifiers 22 and 25 in a well known manner.

The distance between the central office 10 and the bybrid 13 is preselected for all long-line telephone circuits so as to provide a fixed loss. As a result, the impedance as seen from the two-wire termination 12 looking towards the central office 10 remains substantially constant regardless of the terminating impedance at the central office. To effect this, a minimum length of 6,000 feet for the first telephone line 11 is required.

In a typical installation, the resistance of the first telephone line 11 with a fixed length of 15,500 feet would be in the order of 1300 ohms. With variations in the impedance of the central office in the order of 400 ohms, it is evident that the overall impedance as seen from the hybrid 13 remains reasonably constant. Consequently, the balancing network of the hybrid 13 can be designed to optimumly compensate for the line impedance so as to provide maximum return loss from the two-wire termination 12.

The balance of the distance, up to 20,500 feet, between the hybrid 13 and the telephone set 17, is connected by the four-wire telephone line consisting of the two pairs of telephone lines 15 and 19. Speech signals from the transmitter 21 are coupled through the amplifier 22 and the transformer 23 onto the second telephone line 15. They are then coupled through the hybrid 13 in a conventional manner to the first telephone line 11 and thence to the central office 10. Incoming speech signals from the central office 10 are coupled through the first telephone line 11, the hybrid 13 and the third telephone line 19 and thence through the transformer 24, the amplifier 25 and appear as voice signals at the output of the receiver 26.

Since the gain of the amplifiers 22 and 25 is adjusted either manually or automatically to compensate for the loss of the telephone lines 15 and 19 respectively, the amount of sidetone level coupled around the sidetone path from the transmitter 21 to the receiver 26 through the hybrid 13 remains substantially constant. Automatic gain adjustemnt of the amplifiers 22 and 25 can be readily achieved by sensing the d-c line current, which provides a measure of the total line loss, and then adjusting the gain accordingly in a well known manner.

Thus, the gain of the amplifiers 22 and 25 can be set to compensate for line losses without regard to the sidetone level. In addition, the gain characteristics of the amplifiers 22 and 25 can be sloped to compensate for the high frequency roll-off of the telephone lines 15 and 19, thus avoiding the necessity for loading coils between the telephone set 17 and the central office 10. Since the loss of the sidetone path is inherently compensated for by the two amplifiers 22 and 25, No. 26 gauge wire can be used throughout. By these means, the signal levels delivered to the central office can be maintained at a relatively constant level equivalent to that produced by a conventional telephone set on an average loop.

Thus, by locating the hybrid 13 between the central office 10 and the telephone set 17 and at a fixed distance with respect to the central office 10, compensation for long-line circuits can be readily obtained without the use of loading coils and at decreased cost due to the use of finer gauge wire. As with conventional telephone circuits, the system can be extended even further by inserting loading coils in the telephone lines 15 and 19. However, this would apply to only a relatively few cases since the majority of telephone sets are located within 36,000 feet of the central office 10.

What is claimed is:

1. A long-line telephone circuit for connection to a central office, comprising:
   - a telephone set including a transmitter and a receiver;
   - a three port network located between the telephone set and the central office, for connecting a variable length transmit path and a variable length receive path to a common path;
   - the common path being a fixed length and connecting the three port network to the central office, the loss of the common path being sufficient to reflect a substantially constant impedance at the three-port network regardless of the terminating impedance at the central office;
   - a transmit amplifier connecting the transmitter to the three port network via the transmit path, the gain of the transmit amplifier being such as to compensate for the transmission loss of the variable length transmit path and the common path; and
   - a receive amplifier connecting the three port network to the receiver via the receive path, the gain of the receive amplifier being such as to compensate for the transmission loss of the variable length receive path and the common path;
   - the gain of the transmit and receive amplifiers, less the loss of the variable length transmit and receive paths and the loss of the three port network between the variable length transmit and receive paths, being such as to maintain the sidetone level between the transmitter and receiver substantially constant.

2. A long-line telephone circuit for connection to a central office, comprising:
   - a telephone set including a transmitter and receiver;
   - a hybrid, having a two-wire termination and a four-wire termination, located between the telephone set and the central office, a fixed distance from said office;
   - a first telephone line connected between the two-wire termination and the central office, and having sufficient loss to reflect a substantially constant impedance at the hybrid regardless of the terminating impedance at the central office;
   - a second telephone line of variable length connected between an input of the four-wire termination and the telephone set;
   - a third telephone line of variable length connected between an output of the four-wire termination and the telephone set;
   - a transmit amplifier connected between the transmitter and the second telephone line and having sufficient gain to compensate for the loss of the first and second telephone lines; and
   - a receive amplifier connected between the third telephone line and the receiver and having sufficient gain to compensate for the loss of the first and third telephone lines;
   - the gain of the transmit and receive amplifiers less the loss of the second and third telephone lines and the loss through the hybrid between said input and said output of the four-wire termination, being such as to maintain the sidetone level between the transmitter and receiver substantially constant.

3. A long-line telephone circuit as described in claim 2 in which an operating current connected from the central office over the first telephone line is phantomed over the second and third telephone lines through the hybrid.

4. A long-line telephone circuit as defined in claim 3 in which the length of the first telephone line is at least 6,000 feet.

* * * * *